(12) United States Patent
Horel et al.

(10) Patent No.: US 9,203,923 B2
(45) Date of Patent: Dec. 1, 2015

(54) DATA SYNCHRONIZATION INTERFACE

(75) Inventors: Gerald Horel, Brentwood Bay (CA); Julie Yu, San Diego, CA (US); Robert J. Truitt, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1195 days.

(21) Appl. No.: 10/218,371

(22) Filed: Aug. 13, 2002

(65) Prior Publication Data

US 2003/0051047 A1 Mar. 13, 2003

Related U.S. Application Data

(60) Provisional application No. 60/312,737, filed on Aug. 15, 2001.

(51) Int. Cl.
*G06F 15/16* (2006.01)
*H04L 29/08* (2006.01)
(Continued)

(52) U.S. Cl.
CPC ...... *H04L 67/2823* (2013.01); *G06F 17/30575* (2013.01); *G06Q 20/102* (2013.01); *G06Q 30/02* (2013.01); *G06Q 30/04* (2013.01);
(Continued)

(58) Field of Classification Search
CPC ... H04L 29/06; H04L 29/06095; H04L 67/04; H04L 67/2823; H04L 67/2842; H04L 69/08; H04M 2215/96; H04M 2215/7072
USPC ......... 709/203, 206, 219, 231, 232, 246, 245, 709/227, 230; 345/710; 719/328; 370/469; 726/7
See application file for complete search history.

(56) References Cited

U.S. PATENT DOCUMENTS

| 628,294 A | 7/1899 | Ira |
| 4,156,903 A | 5/1979 | Barton et al. |

(Continued)

FOREIGN PATENT DOCUMENTS

| CA | 2267549 A1 | 9/2000 |
| CA | 2363220 A1 | 5/2003 |

(Continued)

OTHER PUBLICATIONS

"SYNCML Represntation Protocol, Version 1.0" SYNCML Representation Protocol, (Dec. 7, 2000), pp. 1-104, Chapters 1-4.

(Continued)

*Primary Examiner* — Thu Ha Nguyen
(74) *Attorney, Agent, or Firm* — Robert J. O'Connell; Satheesh Karra

(57) ABSTRACT

Systems and methods consistent with the present invention provide an interface to facilitate the communication between systems. A source system translates data into an XML format and transmits the data to a synchronizer interface tool. The synchronizer tool stores the data in a persistent intermediate storage, such as a queue, allowing the source system to go offline or perform other tasks while the data is transmitted to the target system. The synchronizer tool initiates the transmission of the data to the target system. If the target system indicates that it received the data, then the synchronizer tool sends an acknowledgement to the source system indicating the data was received. If the target system does not receive the transmission, the synchronizer tool maintains the data in the persistent intermediate storage and reinitiates transmission of the data to the target system.

39 Claims, 4 Drawing Sheets

(51) Int. Cl.
   *G06Q 20/10*   (2012.01)
   *G06Q 30/02*   (2012.01)
   *G06Q 30/04*   (2012.01)
   *H04M 15/00*   (2006.01)
   *H04W 4/24*    (2009.01)
   *G06F 17/30*   (2006.01)
   *H04L 29/06*   (2006.01)

(52) U.S. Cl.
   CPC .............. *H04L 67/04* (2013.01); *H04L 67/14* (2013.01); *H04L 67/2842* (2013.01); *H04M 15/31* (2013.01); *H04M 15/41* (2013.01); *H04M 15/70* (2013.01); *H04M 15/73* (2013.01); *H04W 4/24* (2013.01); *H04L 69/08* (2013.01); *H04M 2215/0164* (2013.01); *H04M 2215/2026* (2013.01); *H04M 2215/32* (2013.01); *H04M 2215/70* (2013.01); *H04M 2215/7072* (2013.01); *H04M 2215/96* (2013.01)

(56) References Cited

U.S. PATENT DOCUMENTS

| | | | |
|---|---|---|---|
| 4,975,942 A | 12/1990 | Zebryk | |
| 5,005,122 A | 4/1991 | Griffin et al. | |
| 5,329,619 A * | 7/1994 | Page et al. | 709/203 |
| 5,564,070 A | 10/1996 | Want et al. | |
| 5,608,781 A | 3/1997 | Seiderman | |
| 5,619,247 A | 4/1997 | Russo | |
| 5,634,012 A | 5/1997 | Stefik et al. | |
| 5,666,293 A | 9/1997 | Metz et al. | |
| 5,666,397 A | 9/1997 | Lamons et al. | |
| 5,761,485 A | 6/1998 | Munyan | |
| 5,812,988 A | 9/1998 | Sandretto | |
| 5,845,267 A | 12/1998 | Ronen | |
| 5,852,812 A | 12/1998 | Reeder | |
| 5,857,201 A * | 1/1999 | Wright et al. | 1/1 |
| 5,907,837 A | 5/1999 | Ferrel et al. | |
| 5,940,752 A | 8/1999 | Henrick | |
| 5,956,034 A | 9/1999 | Sachs et al. | |
| 5,970,490 A | 10/1999 | Morgenstern | |
| 5,986,690 A | 11/1999 | Hendricks | |
| 6,035,281 A | 3/2000 | Crosskey et al. | |
| 6,047,051 A | 4/2000 | Ginzboorg et al. | |
| 6,088,717 A | 7/2000 | Reed et al. | |
| 6,141,404 A | 10/2000 | Westerlage et al. | |
| 6,151,606 A | 11/2000 | Mendez | |
| 6,181,704 B1 | 1/2001 | Drottar et al. | |
| 6,185,198 B1 | 2/2001 | LaDue | |
| 6,185,683 B1 | 2/2001 | Gitner et al. | |
| 6,202,051 B1 | 3/2001 | Woolston | |
| 6,226,618 B1 | 5/2001 | Downs et al. | |
| 6,230,168 B1 | 5/2001 | Unger et al. | |
| 6,230,269 B1 | 5/2001 | Spies et al. | |
| 6,253,189 B1 | 6/2001 | Feezell et al. | |
| 6,253,239 B1 | 6/2001 | Shklar et al. | |
| 6,253,326 B1 * | 6/2001 | Lincke et al. | 726/12 |
| 6,263,326 B1 | 7/2001 | Chandra | |
| 6,263,362 B1 | 7/2001 | Donoho et al. | |
| 6,266,401 B1 | 7/2001 | Marchbanks et al. | |
| 6,269,157 B1 | 7/2001 | Coyle | |
| 6,282,294 B1 | 8/2001 | Deo et al. | |
| 6,311,223 B1 * | 10/2001 | Bodin et al. | 709/247 |
| 6,321,078 B1 | 11/2001 | Menelli et al. | |
| 6,324,565 B1 * | 11/2001 | Holt, III | 709/203 |
| 6,327,574 B1 | 12/2001 | Kramer et al. | |
| 6,334,114 B1 | 12/2001 | Jacobs et al. | |
| 6,334,116 B1 | 12/2001 | Ganesan et al. | |
| 6,336,137 B1 * | 1/2002 | Lee et al. | 709/219 |
| 6,343,318 B1 * | 1/2002 | Hawkins et al. | 709/219 |
| 6,366,893 B2 | 4/2002 | Hannula et al. | |
| 6,381,325 B1 | 4/2002 | Hanson | |
| 6,389,464 B1 * | 5/2002 | Krishnamurthy et al. | 709/220 |
| 6,427,076 B2 | 7/2002 | Skog | |
| 6,434,535 B1 | 8/2002 | Kupka et al. | |
| 6,453,160 B1 | 9/2002 | Thomas et al. | |
| 6,460,076 B1 | 10/2002 | Srinivasan | |
| 6,463,534 B1 | 10/2002 | Geiger et al. | |
| 6,493,722 B1 | 12/2002 | Daleen et al. | |
| 6,535,726 B1 | 3/2003 | Johnson | |
| 6,549,770 B1 | 4/2003 | Marran | |
| 6,597,903 B1 | 7/2003 | Dahm et al. | |
| 6,598,026 B1 | 7/2003 | Ojha et al. | |
| 6,606,744 B1 | 8/2003 | Mikurak | |
| 6,622,017 B1 | 9/2003 | Hoffman | |
| 6,628,934 B2 | 9/2003 | Rosenberg et al. | |
| 6,665,711 B1 * | 12/2003 | Boyle et al. | 709/219 |
| 6,683,941 B2 | 1/2004 | Brown et al. | |
| 6,704,716 B1 | 3/2004 | Force | |
| 6,721,716 B1 | 4/2004 | Gross | |
| 6,741,980 B1 | 5/2004 | Langseth et al. | |
| 6,742,043 B1 * | 5/2004 | Moussa et al. | 709/232 |
| 6,880,750 B2 | 5/2004 | Pentel | |
| 6,754,320 B2 | 6/2004 | Daase et al. | |
| 6,757,710 B2 | 6/2004 | Reed | |
| 6,792,271 B1 | 9/2004 | Sherman et al. | |
| 6,792,280 B1 | 9/2004 | Hori et al. | |
| 6,816,721 B1 | 11/2004 | Rudisill | |
| 6,820,121 B1 * | 11/2004 | Callis et al. | 709/225 |
| 6,857,067 B2 | 2/2005 | Edelman | |
| 6,873,936 B2 | 3/2005 | Reed et al. | |
| 6,883,142 B2 | 4/2005 | Shimamoto et al. | |
| 6,928,441 B2 | 8/2005 | Haegele | |
| 6,937,996 B1 | 8/2005 | Forsythe et al. | |
| 6,941,139 B1 | 9/2005 | Shupe et al. | |
| 6,941,270 B1 | 9/2005 | Hannula | |
| 6,954,793 B2 | 10/2005 | Ramaswamy et al. | |
| 6,957,793 B2 | 10/2005 | Gautier et al. | |
| 6,965,883 B2 | 11/2005 | Xu et al. | |
| 6,978,273 B1 | 12/2005 | Bonneau et al. | |
| 6,985,882 B1 | 1/2006 | Del Sesto | |
| 6,996,537 B2 | 2/2006 | Minear et al. | |
| 7,010,303 B2 | 3/2006 | Lewis et al. | |
| 7,010,500 B2 | 3/2006 | Aarnio | |
| 7,013,289 B2 * | 3/2006 | Horn et al. | 705/14.51 |
| 7,039,389 B2 | 5/2006 | Johnson, Jr. | |
| 7,043,447 B2 | 5/2006 | Hughes et al. | |
| 7,047,405 B2 | 5/2006 | Mauro | |
| 7,068,680 B1 * | 6/2006 | Kaltenmark et al. | 370/469 |
| 7,113,766 B2 | 9/2006 | Horel et al. | |
| 7,117,504 B2 * | 10/2006 | Smith et al. | 719/328 |
| 7,155,205 B2 | 12/2006 | Cerami et al. | |
| 7,177,837 B2 | 2/2007 | Pegaz-Paquet et al. | |
| 7,184,747 B2 | 2/2007 | Bogat | |
| 7,200,566 B1 | 4/2007 | Moore et al. | |
| 7,218,917 B2 | 5/2007 | Pradhan et al. | |
| 7,228,333 B1 * | 6/2007 | Smith | 709/206 |
| 7,233,790 B2 | 6/2007 | Kjellberg et al. | |
| 7,260,194 B1 | 8/2007 | Meyers et al. | |
| 7,278,164 B2 | 10/2007 | Raiz et al. | |
| 7,286,655 B2 | 10/2007 | Voorman et al. | |
| 7,293,099 B1 * | 11/2007 | Kalajan | 709/230 |
| 7,334,025 B2 | 2/2008 | Kuriya | |
| 7,362,745 B1 | 4/2008 | Cope et al. | |
| 7,415,439 B2 | 8/2008 | Kontio et al. | |
| 7,436,816 B2 | 10/2008 | Mehta et al. | |
| 7,444,411 B2 | 10/2008 | Sung | |
| 7,467,198 B2 * | 12/2008 | Goodman et al. | 709/223 |
| 7,490,045 B1 | 2/2009 | Flores et al. | |
| 7,526,450 B2 | 4/2009 | Hughes et al. | |
| 7,574,377 B2 | 8/2009 | Carapelli | |
| 7,577,616 B2 | 8/2009 | Zhu | |
| 7,583,953 B2 | 9/2009 | Choi et al. | |
| 7,660,755 B2 | 2/2010 | Amato et al. | |
| 7,711,680 B2 * | 5/2010 | Barnes-Leon et al. | 717/102 |
| 7,752,217 B2 * | 7/2010 | Sawashima et al. | 707/760 |
| 7,894,803 B2 | 2/2011 | Kamada | |
| 7,904,528 B2 | 3/2011 | Zilliacus et al. | |
| 7,907,937 B2 | 3/2011 | Engelhart | |
| 8,028,056 B1 * | 9/2011 | Krishna et al. | 709/223 |
| 8,150,736 B2 * | 4/2012 | Horn et al. | 705/26.1 |
| 8,489,470 B2 * | 7/2013 | Kahlon et al. | 705/28 |
| 2001/0013020 A1 | 8/2001 | Yoshida et al. | |
| 2001/0032254 A1 * | 10/2001 | Hawkins | 709/219 |

(56) References Cited

U.S. PATENT DOCUMENTS

| | | |
|---|---|---|
| 2001/0034686 A1 | 10/2001 | Eder |
| 2001/0036271 A1 | 11/2001 | Javed |
| 2001/0037304 A1 | 11/2001 | Paiz |
| 2001/0056362 A1 | 12/2001 | Hanagan et al. |
| 2002/0002603 A1* | 1/2002 | Vange .................... 709/219 |
| 2002/0004935 A1 | 1/2002 | Huotari et al. |
| 2002/0019764 A1 | 2/2002 | Mascarenhas |
| 2002/0022472 A1 | 2/2002 | Watler et al. |
| 2002/0022971 A1 | 2/2002 | Tanaka et al. |
| 2002/0029197 A1 | 3/2002 | Kailamaki et al. |
| 2002/0029200 A1 | 3/2002 | Dulin et al. |
| 2002/0035688 A1 | 3/2002 | Kutaragi et al. |
| 2002/0035699 A1 | 3/2002 | Crosbie |
| 2002/0049717 A1 | 4/2002 | Routtenberg et al. |
| 2002/0052754 A1 | 5/2002 | Joyce et al. |
| 2002/0052968 A1* | 5/2002 | Bonefas et al. .......... 709/231 |
| 2002/0062290 A1 | 5/2002 | Ricci |
| 2002/0069176 A1 | 6/2002 | Newman |
| 2002/0069244 A1 | 6/2002 | Blair et al. |
| 2002/0069263 A1 | 6/2002 | Sears |
| 2002/0071559 A1 | 6/2002 | Christensen et al. |
| 2002/0083006 A1 | 6/2002 | Headings et al. |
| 2002/0083050 A1* | 6/2002 | Liu et al. ................... 707/3 |
| 2002/0107706 A1 | 8/2002 | Oliver et al. |
| 2002/0107795 A1 | 8/2002 | Minear et al. |
| 2002/0107809 A1 | 8/2002 | Biddle |
| 2002/0109706 A1* | 8/2002 | Lincke et al. ............ 345/700 |
| 2002/0111904 A1 | 8/2002 | Gruber et al. |
| 2002/0128908 A1 | 9/2002 | Levin et al. |
| 2002/0129108 A1* | 9/2002 | Sykes, Jr. ................. 709/206 |
| 2002/0129165 A1* | 9/2002 | Dingsor et al. ........... 709/246 |
| 2002/0131401 A1 | 9/2002 | Ehreth |
| 2002/0131404 A1 | 9/2002 | Mehta et al. |
| 2002/0160752 A1 | 10/2002 | Hook et al. |
| 2002/0162112 A1 | 10/2002 | Javed |
| 2002/0165822 A1 | 11/2002 | Makipaa |
| 2002/0176553 A1 | 11/2002 | Aschir |
| 2002/0194143 A1 | 12/2002 | Banerjee et al. |
| 2002/0194357 A1* | 12/2002 | Harris et al. ............. 709/232 |
| 2003/0005136 A1 | 1/2003 | Eun |
| 2003/0023550 A1 | 1/2003 | Lee |
| 2003/0028903 A1 | 2/2003 | Horfrichter et al. |
| 2003/0046396 A1 | 3/2003 | Richter et al. |
| 2003/0060188 A1 | 3/2003 | Gidron et al. |
| 2003/0074328 A1 | 4/2003 | Schiff et al. |
| 2003/0078844 A1 | 4/2003 | Takatori et al. |
| 2003/0078886 A1 | 4/2003 | Minear et al. |
| 2003/0078895 A1 | 4/2003 | MacKay |
| 2003/0083973 A1 | 5/2003 | Horsfall |
| 2003/0083991 A1 | 5/2003 | Kikinis |
| 2003/0093461 A1* | 5/2003 | Suzuki et al. ............ 709/202 |
| 2003/0093565 A1* | 5/2003 | Berger et al. ............ 709/246 |
| 2003/0096591 A1 | 5/2003 | Pohutsky et al. |
| 2003/0110044 A1 | 6/2003 | Nix et al. |
| 2003/0110213 A1 | 6/2003 | Munetsugu et al. |
| 2003/0110296 A1* | 6/2003 | Kirsch et al. ............ 709/246 |
| 2003/0120594 A1 | 6/2003 | Shaginaw et al. |
| 2003/0149958 A1 | 8/2003 | Baluja et al. |
| 2003/0151621 A1 | 8/2003 | McEvilly et al. |
| 2003/0197719 A1* | 10/2003 | Lincke et al. ............ 345/710 |
| 2003/0208444 A1 | 11/2003 | Sauer |
| 2003/0212904 A1 | 11/2003 | Randle et al. |
| 2003/0233329 A1 | 12/2003 | Laraki et al. |
| 2003/0236867 A1 | 12/2003 | Natsuno et al. |
| 2004/0006517 A1 | 1/2004 | Takatori |
| 2004/0015413 A1 | 1/2004 | Abu-Hejleh et al. |
| 2004/0015562 A1 | 1/2004 | Harper et al. |
| 2004/0030601 A1 | 2/2004 | Pond et al. |
| 2004/0043753 A1 | 3/2004 | Wake et al. |
| 2004/0044623 A1 | 3/2004 | Wake et al. |
| 2004/0137890 A1 | 7/2004 | Kalke |
| 2004/0139012 A1 | 7/2004 | Koskinen et al. |
| 2004/0181591 A1 | 9/2004 | Yu et al. |
| 2004/0267630 A1 | 12/2004 | Au et al. |
| 2005/0027872 A1* | 2/2005 | Srinivas .................. 709/227 |
| 2005/0086348 A1* | 4/2005 | Balassanian ............. 709/230 |
| 2005/0090258 A1* | 4/2005 | Coppinger et al. ....... 455/436 |
| 2005/0113092 A1* | 5/2005 | Coppinger et al. ....... 455/436 |
| 2005/0114155 A1 | 5/2005 | Hodges et al. |
| 2005/0125315 A1 | 6/2005 | Munoz et al. |
| 2005/0132049 A1* | 6/2005 | Inoue et al. .............. 709/225 |
| 2005/0148319 A1 | 7/2005 | Himeno |
| 2005/0192878 A1 | 9/2005 | Minear et al. |
| 2005/0289047 A1 | 12/2005 | Oliver et al. |
| 2006/0014535 A1 | 1/2006 | Walker et al. |
| 2006/0015565 A1* | 1/2006 | Nainani et al. ........... 709/206 |
| 2006/0080232 A1 | 4/2006 | Epps |
| 2006/0143119 A1 | 6/2006 | Krueger et al. |
| 2006/0173758 A1 | 8/2006 | Minear et al. |
| 2006/0235931 A1* | 10/2006 | Ruthe et al. ............. 709/206 |
| 2006/0253350 A1 | 11/2006 | Falkenhain et al. |
| 2006/0270386 A1 | 11/2006 | Yu et al. |
| 2006/0271449 A1 | 11/2006 | Oliver et al. |
| 2007/0003034 A1 | 1/2007 | Schultz et al. |
| 2007/0038703 A1* | 2/2007 | Tendjoukian et al. .... 709/206 |
| 2007/0066279 A1 | 3/2007 | Silverbrook et al. |
| 2007/0083464 A1 | 4/2007 | Cordero Torres et al. |
| 2007/0123229 A1 | 5/2007 | Pousti |
| 2007/0169163 A1 | 7/2007 | Morio et al. |
| 2007/0174308 A1* | 7/2007 | Rausch .................... 707/100 |
| 2007/0197188 A1 | 8/2007 | Sprigg et al. |
| 2007/0197189 A1 | 8/2007 | Horel et al. |
| 2011/0030042 A1* | 2/2011 | Neal-Joslin ................. 726/7 |
| 2011/0143709 A1 | 6/2011 | Pousti |
| 2012/0309345 A1 | 12/2012 | Wake et al. |

FOREIGN PATENT DOCUMENTS

| | | |
|---|---|---|
| CN | 1459183 A | 11/2003 |
| EP | 0780802 A2 | 6/1997 |
| EP | 0895148 | 2/1999 |
| EP | 1026610 A2 | 8/2000 |
| EP | 1026853 | 8/2000 |
| EP | 1033652 | 9/2000 |
| EP | 1047030 A2 | 10/2000 |
| EP | 1102191 | 5/2001 |
| EP | 1122967 A2 | 8/2001 |
| EP | 1 162 807 A2 * | 12/2001 |
| EP | 1204054 A2 | 5/2002 |
| EP | 1403797 A1 | 3/2004 |
| EP | 1404100 A1 | 3/2004 |
| EP | 1414185 A2 | 4/2004 |
| FR | 2775550 | 9/1999 |
| GB | 2349548 | 11/2000 |
| JP | 07044261 | 2/1995 |
| JP | 2007-319691 | 8/1995 |
| JP | 07319691 A | 12/1995 |
| JP | 09319573 | 12/1997 |
| JP | 1066050 | 3/1998 |
| JP | 10140283 | 5/1998 |
| JP | 1060873 | 9/1998 |
| JP | 10262059 A | 9/1998 |
| JP | 11053185 A | 2/1999 |
| JP | 11055252 A | 2/1999 |
| JP | 11069017 | 3/1999 |
| JP | 11126188 A | 5/1999 |
| JP | 200056967 | 2/2000 |
| JP | 2000078129 A | 3/2000 |
| JP | 2000357196 A | 12/2000 |
| JP | 2001195451 A | 7/2001 |
| JP | 2001202434 A | 7/2001 |
| JP | 2001-250069 | 9/2001 |
| JP | 2001-312324 | 9/2001 |
| JP | 2001243382 A | 9/2001 |
| JP | 2001265938 | 9/2001 |
| JP | 2001268623 A | 9/2001 |
| JP | 2001-320509 | 11/2001 |
| JP | 2001312666 A | 11/2001 |
| JP | 2001319168 A | 11/2001 |
| JP | 2001325234 | 11/2001 |
| JP | 2001352583 | 12/2001 |
| JP | 2002007839 A | 1/2002 |
| JP | 2002015160 A | 1/2002 |
| JP | 2002-027151 | 2/2002 |

(56) References Cited

FOREIGN PATENT DOCUMENTS

| | | |
|---|---|---|
| JP | 2002-91850 | 3/2002 |
| JP | 2002093361 A | 3/2002 |
| JP | 2002094450 A | 3/2002 |
| JP | 2002101315 A | 4/2002 |
| JP | 2002109395 A | 4/2002 |
| JP | 2002-099289 | 5/2002 |
| JP | 2002-99441 | 5/2002 |
| JP | 2002132367 | 5/2002 |
| JP | 2002133316 A | 5/2002 |
| JP | 2002-175387 | 6/2002 |
| JP | 2002163258 | 6/2002 |
| JP | 2002163467 A | 6/2002 |
| JP | 2002197294 | 7/2002 |
| JP | 2002245350 A | 8/2002 |
| JP | 2002279103 A | 9/2002 |
| JP | 2002329249 A | 11/2002 |
| JP | 2002335336 | 11/2002 |
| JP | 2002353885 A | 12/2002 |
| JP | 2003016041 A | 1/2003 |
| JP | 2003016093 | 1/2003 |
| JP | 2003518885 A | 6/2003 |
| JP | 2003187083 A | 7/2003 |
| JP | 2004004157 A | 1/2004 |
| JP | 2004005044 A | 1/2004 |
| JP | 2004135229 A | 4/2004 |
| JP | 2004185197 | 7/2004 |
| JP | 2004220546 | 8/2004 |
| JP | 3609398 | 1/2005 |
| JP | 2005078325 A | 3/2005 |
| JP | 2005519407 A | 6/2005 |
| JP | 2005198021 A | 7/2005 |
| JP | 2006505966 A | 2/2006 |
| JP | 2007527570 A | 9/2007 |
| JP | 2008514743 A | 5/2008 |
| JP | 2010178027 A | 8/2010 |
| KR | 2000-72521 | 12/2000 |
| KR | 20010078968 | 8/2001 |
| KR | 20020039648 | 5/2002 |
| KR | 2003-0042660 | 6/2003 |
| KR | 102003005056 | 6/2003 |
| KR | 20030078446 | 10/2003 |
| KR | 20070007954 | 1/2007 |
| RU | 2165679 | 4/2001 |
| RU | 2191482 | 10/2002 |
| RU | 2212057 | 9/2003 |
| TW | 161301 | 6/1991 |
| TW | 388021 | 4/2000 |
| TW | 466858 | 12/2001 |
| TW | 499645 | 8/2002 |
| WO | 9308545 A1 | 4/1993 |
| WO | 9726739 A1 | 7/1997 |
| WO | 9745814 | 12/1997 |
| WO | 9821676 | 5/1998 |
| WO | 9931610 | 6/1999 |
| WO | 9941861 A1 | 8/1999 |
| WO | 9952077 | 10/1999 |
| WO | WO-0002112 A2 | 1/2000 |
| WO | 0031672 A1 | 6/2000 |
| WO | WO-0043962 A1 | 7/2000 |
| WO | 0056033 | 9/2000 |
| WO | 0079451 | 12/2000 |
| WO | 0143390 A2 | 6/2001 |
| WO | 0150305 A2 | 7/2001 |
| WO | WO-0149048 A1 | 7/2001 |
| WO | 0163532 | 8/2001 |
| WO | 0163900 A1 | 8/2001 |
| WO | 0169891 | 9/2001 |
| WO | 0197104 | 12/2001 |
| WO | WO-0203219 A1 | 1/2002 |
| WO | 0231718 | 4/2002 |
| WO | WO0244892 | 6/2002 |
| WO | 02063537 | 8/2002 |
| WO | 02067600 | 8/2002 |
| WO | WO02063536 A2 | 8/2002 |
| WO | WO-02073934 A2 | 9/2002 |
| WO | WO-02093361 A1 | 11/2002 |
| WO | WO-02103459 A2 | 12/2002 |
| WO | 03017171 A1 | 2/2003 |
| WO | WO-03032618 A1 | 4/2003 |
| WO | WO-03050743 A1 | 6/2003 |
| WO | 03075584 A2 | 9/2003 |
| WO | 03079256 A1 | 9/2003 |
| WO | WO-03085943 A1 | 10/2003 |
| WO | 2004003708 A2 | 1/2004 |
| WO | 2004084526 A2 | 9/2004 |
| WO | 2005004456 | 1/2005 |
| WO | 2005008383 A2 | 1/2005 |
| WO | WO2005020027 A2 | 3/2005 |
| WO | WO-2005069917 | 8/2005 |
| WO | 2006130539 A2 | 12/2006 |

OTHER PUBLICATIONS

Arar, Yardena, "Download apps to a phone," PC World, Jun. 2002, v20i6 pp. 64, Proquest #120993020 3 pgs.

Atsuyuki Morishima, "Efficient Construction of Materialized XML Views With Silkroute", IPSJ SIG Notes, Japan, Information Processing Society of Japan, Jul. 17, 2001, vol. 2001, No. 70, pp. 421-428.

Butrico M A et al: "Gold Rush: Mobile Transaction Middleware With Java-Object Replication" Conference on Object'—Oriented Technologies, (Jun. 16, 1997), pp. 91-101.

Goldenberg-Hart, Diane, "A Glossary of Selected Internet and Computing Terms," Yale University Library, Jun. 1996. Retrieved from http://www.library.yale.edu/ref/internet/intgloss.htm.

M2 Presswire. Convergys: Genie Mobile chooses Geneva Billing software, continuing the momentum of the merger between Convergys and Geneva Technology. Coventry: Jun. 1, 2001, p. 1.

No Author, "AvantGo 4.0 Powers Wireless Applications and Services," Customer Inter@ction Solutions, May 2001, vol. 19, Issue 11, p. 71.

No Author, "Sony Pictures to Sell Movies via Internet," Jul. 9, 2001, Source: Japan Computer Industry Scan.

PR Newswire. China Unicom Selects QUALCOMM's BREW Solution as Its Platform to Launch Wireless Data Applications. New York, Aug. 26, 2002, p. 1.

QUALCOMM; "Binary Runtime Environment for Wireless, BREW Application note: Developing BREW Applications for Devices with RUIM Units" (Online) Jan. 10, 2005, pp. 1-11, XP002410586 San Diego Retrieved from the internet: URL:http://brew.qualcomm.com/brew_bnry/pdf/.

QUALCOMM; BREW Distribution System (BDS) Overview (online) 2003, pp. 1-17, XP002410587 San Diego Retrieved from the Internet: URL:http.wirelessknowledge.com/brew/images/about/pdf/bds.pdf> [retrieved on Dec. 6, 2006] the whole document.

Rigdon, Joan E., "CyberSource Begins to Offer Software of Symantec and Others on the Internet," Wall Street Journal, Jan. 31, 1995.

SYNCML Consortium: "SYNCML Sync Protocol, Version 1.0" (Dec. 7, 2000), Chapters 1,2,5-8.

SYNCML Consortium: "SYNCML Sync Protocol, Version 1.0.1" (Jun. 15, 2001).

International Preliminary Examination Report—PCT/US02/026035, IPEA/US-09-02-04.

International Search Report—PCT/US02/026035, International Search Authority—United States-01-02-03.

Supplementary European Search Report—EP02752842, Search Authority—The Hague-08-25-04.

USA Group Selects Clikc-N-Done for Electronic Bill Presentment and Patment; Software Will Support Online Presentment and Payment for Education Loan Borrowers Business Editors, Internet Writers. Business Wire. New York: Apr. 24, 2000. p. 1.

Amendment dated Oct. 14, 2008, U.S. Appl. No. 11/141,934.

Amendment dated Aug. 8, 2007, U.S. Appl. No. 11/141,807.

Amendment dated Dec. 23, 2007, U.S. Appl. No. 11/141,807.

Anonymous, "BPM in Action: iUniverse," Intelligent Enterprise, San Mateo, May 15, 2004, vol. 7, Issue 8, 2 pages (recovered from ProQuest on Jun. 5, 2009).

Anonymous: "BREW TM Application Note: Developing BREW Applications for Devices with RUIM Units", 20050514, May 14,

(56) References Cited

OTHER PUBLICATIONS 2005, pp. 1-11, XP007920607, Retrieved from the Internet: URL:http://web.archive.org/web/20050514075656/http://brew.qualcomm.com/brew_bnry/pdf/developer/resources/ds/Dev_BREW_Apps.pdf.

Anonymous: "Internet Archive Wayback Machine", Internet Citation, May 14, 2005, p. 1, XP007920684, Retrieved from the Internet: URL:http://wayback.archive.org/web/200506150000007*/http://brew.qualcomm.com/brew_bnry/pdf/developer/resources/ds/Dev_BREW_Apps.pdf [retrieved on Jun. 4, 2012].

Business Wire, Informix Announces Key Customer Wins in Fourth Quarter; Leading Companies and Government Entities in Key Markets Around the World Respond to Informer's Technology Strategy Business/Technology Editors. Business Wire. New York: Jan. 27, 1999, p. 1.

Diebold Teams with Health System Services to Offer a Complete Distribution Package for Pharmacy Medication and Supplies PR Newswire. New York: May 28, 1998. p. 1.

Anonymous: "BREW TM Application Note: Developing BREW Applications for Devices with RUIM Units", 20050514, May 14, 2005, pp. 1-11, XP007920607, Retrieved from the Internet: URL:http://web.archive.org/web/20050514075656/http://brew.qualcomm.com/brew_bnry/pdf/developerresources/ds/Dev_BREW_Apps.pdf.

Anonymous: "Internet Archive Wayback Machine", Internet Citation, May 14, 2005, p. 1, XP007920684, Retrieved from the Internet: URL:http://wayback.archive.org/web/200506150000007*/http://brew.qualcomm.com/brew_bnry/pdf/developer/resources/ds/Dev_$_{L\ BREW\_}$Apps.pdf [retrieved on Jun. 4, 2012].

Business Wire, "Informix Announces Key Customer Wins in Fourth Quarter; Leading Companies and Government Entities in Key Markets Around the World Respond to Informer's Technology Strategy", Business/Technology Editors. Business Wire. New York: Jan. 27, 1999, pg. 1-8.

Classified Ad 3—No Title, New York Daily Times (1851-1857); Nov. 15, 1853; ProQuest Historical Newspapers: The New York Times (1851-2008) p. 4.

Classified Ad 74—No Title. Chicago Daily Tribune (1923-1963); Oct. 11, 1959; ProQuest Historical Newspapers: Chicago Tribune (1849-1989) p. G34.

"Ellipsus' Mobile Aplication Provisioning System", Internet Citation, Dec. 2, 2001, XP002266188, Retrieved from the Internet: URL: web.archive.orgfwww.ellipsus.com [retrieved on Jan. 7, 2004].

Fujii, H. "Brew application, flexibility in development comparable to PCs, powerful in enterprise system cooperation of cellular phones," Solution IT, vol. 14, No. 11, Japan, RIC Telecom, Nov. 1, 2002, pp. 22-24.

PR Newswire, "Diebold Teams with Health System Services to Offer a Complete Distribution Package for Pharmacy Medication and Supplies". New York: May 28, 1998. p. 1-3.

Telesens: TelesensKSCL and Comptel sign strategic agreement; New alliance expands best of suite billing offering and furthers drive towards comprehensive next generation solution for network service providers M2 Presswire, Coventry, Nov. 28, 2000, p. 1.

Oommen P., "Over the Air Handset Management," Emerging Technologies Symposium, Broadband, Wireless Internet Access, 2000, IEEE Apr. 10-11, 2000, Piscataway, NJ, USA, IEEE, Apr. 10, 2000, pp. 1-4, XP010538894, ISBN: 0-7803-6364-7.

"How can wireless models help my business?", Computer Weekly, Dec. 2, 2003; p. 1-5, Available from: Business Source Complete, Ipswich, MA. Accessed Jul. 1, 2013.

Mcauliffe W., "Broadband heading for move to metered billing", New Media Age, Apr. 29, 2004; p. 1, Available from: Business Source Complete, Ipswich, MA. Accessed Jul. 1, 2013.

Floyd R, et al., "Mobile Web Access Using Enetwork Web Express", IEEE Personal Communications, IEEE Communications Society, US, vol. 5, No. 5, Oct. 1, 1998, pp. 47-52, XP000786616.

Seifert A., et al. "A Multi-Version Cache Replacement and Prefetching Policy for Hybrid Data Delivery Environments," Proceeding VLDB '02 Proceedings of the 28th international conference on Very Large, Jan. 1, 2002, pp. 850-861, XP055148735.

\* cited by examiner

DATA SYNCHRONIZATION INTERFACE

CROSS-REFERENCE TO RELATED APPLICATION

This application claims the benefit of Provisional Application No. 60/312,737, filed Aug. 15, 2001, pending, which application is incorporated herein by reference in its entirety.

BACKGROUND OF THE INVENTION

I. Field of the Invention

The present invention generally relates to communication between systems. More particularly, the invention relates to a communication interface to aid transferring of data and information between systems and/or databases.

II. Description of the Related Art

Wireless devices, such as cellular telephones, personal digital assistants ("PDAs"), pagers, laptops with wireless connectivity, etc., communicate packets including voice and data over a wireless network. These wireless devices have installed application programming interfaces ("APIs") onto their local computer platform that allow software developers to create software applications that operate on the wireless device. The API sits between the wireless device system software and the software application, making the wireless device functionality available to the application without requiring the software developer to have the specific wireless device system source code.

These wireless devices typically need to communicate with other systems and databases within the other systems. Unfortunately, the wireless device may lose a signal during communication or be otherwise unavailable when transmitting information to other systems. This may cause errors when attempting to access a database when the signal is lost. The wireless device may be required to reinitiate the database access and resubmit the database request when the signal is reacquired.

Extended beyond wireless devices, often wire-based systems need to communicate with each other but do not share a similar "language" for communication. For example, as with wireless devices, one system may need to communicate with the database in another system to receive or insert data. To communicate with the database, the system must be aware of the database language, record and field structures, and formats in order to access and store information in the database. While current technologies provide for the ability for the interface between the system and the database to include the language, structure and format of the database, this becomes more complex when multiple databases, possibly requiring multiple unique database languages, etc., need to be accessed.

Furthermore, when data is to be sent to multiple systems, or conversely received from multiple systems, a common interface does not exist to integrate across the multiple systems to simplify the data transmission. This is problematic for systems communicating with several other systems.

Therefore, what is needed in the art is an interface that simplifies the communication between one or multiple databases and provides reliable and secure transfer of information between multiple systems.

Current methods in the art do not address this need. Database replication services and custom built database interfaces can become very complex and unwieldy if multiple databases need to be accessed. In addition, all systems that access the custom database must have that interface. Also, custom built databases are required to stay online for transactions to occur.

Electronic Data Interchange (EDI) only addresses the need for pre-defined message types and content specific to electronic commerce. The EDI message formats do not address the data exchange needs as it relates to wireless services, system integration considerations and billing specificity.

SUMMARY OF THE INVENTION

System and methods consistent with the present invention overcome the shortcoming of existing systems by providing an interface to facilitate communication between systems. A source system translates data into an common format, such as, the XML format, and transmits the data to an data synchronizer interface tool. The tool stores the data in the common format in a persistent intermediate storage, such as, a queue, allowing the source system to go offline or to perform other tasks. The interface transmits the data in the common format to a target system, which may ackwnowlege receipt of the data, thereby permitting the tool to decide whether to reinitiate the transfer or to delete the data from the persistent intermediate storage.

In one embodiment, the present invention provides a method of processing information in an interface comprising receiving data in a first format from a source system, storing the data in a persistent intermediate storage, initiating the transmission of the information to the target system while retaining the information, receiving an indication that the transmission of information to the target system was unsuccessful, and reinitiating the transmission of the information to the target system. The method may further include storing data received from multiple source systems associated with multiple target systems, and initiating the transmission of the data from multiple source systems to the associated multiple target systems. Also, the method may include receiving an source system acknowledgement indicating the acknowledgement was received and removing the data from the persistent intermediate storage.

Other objects, advantages, and features of the present invention will become apparent after review of the hereinafter set forth Brief Description of the Drawings, Detailed Description of the Invention, and the Claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention. In the drawings.

DETAILED DESCRIPTION OF THE INVENTION

Figure 1:
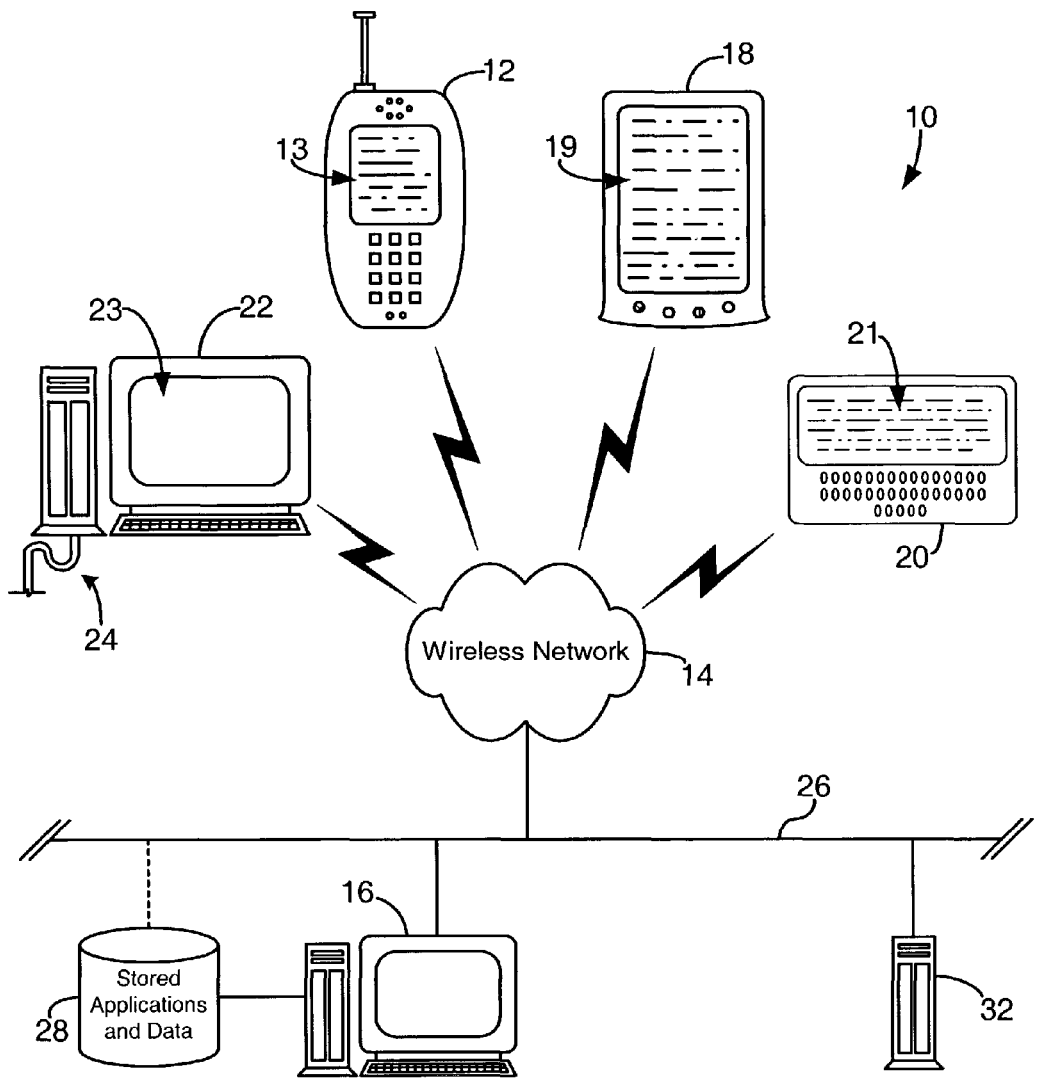
FIG. 1 is a representative diagram of a wireless network and the computer hardware and wireless devices that can be used in an exemplary embodiment of the present invention.

Reference will now be made in detail to the presently exemplary and preferred embodiments of the invention as illustrated in the accompanying drawings, in which like reference characters designate like or corresponding parts throughout the several drawings. The nature, objectives and advantages of the present invention will become more apparent to those skilled in the art after considering the following detailed description in connection with the accompanying drawings.

FIG. 1 illustrates an architecture in which one embodiment of the present invention may be implemented using one or more wireless devices, such as cellular telephone 12, in communication across a wireless network 14 with at least one network server, such as application download server 16, that selectively downloads or provided access to software applications or other data to the wireless devices across a wireless communication portal or other data access to the wireless network 14. As shown here, the wireless device can be a cellular telephone 12, with a graphics display 13, a personal digital assistant 18 with PDA screen 19, a pager 20 with a graphics display 21, which is shown here as a two-way text pager, or even a separate computer platform 22 that has a wireless communication portal and a display 23, and may otherwise have a wired connection 24 to a network or the Internet. The system 10 can include any form of remote computer module including a wireless communication portal, including without limitation, wireless modems, PCMCIA cards, access terminals, personal computers, access terminals, telephones without a display or keypad, or any combination or sub-combination thereof.

The application download server 16 is shown here on a local server-side network 26 with other computer elements in communication with the wireless network 14, such as a database 28 with stored applications and data that contains software applications and data that are accessible and downloadable to the wireless devices 12,18,20,22.

Figure 2:
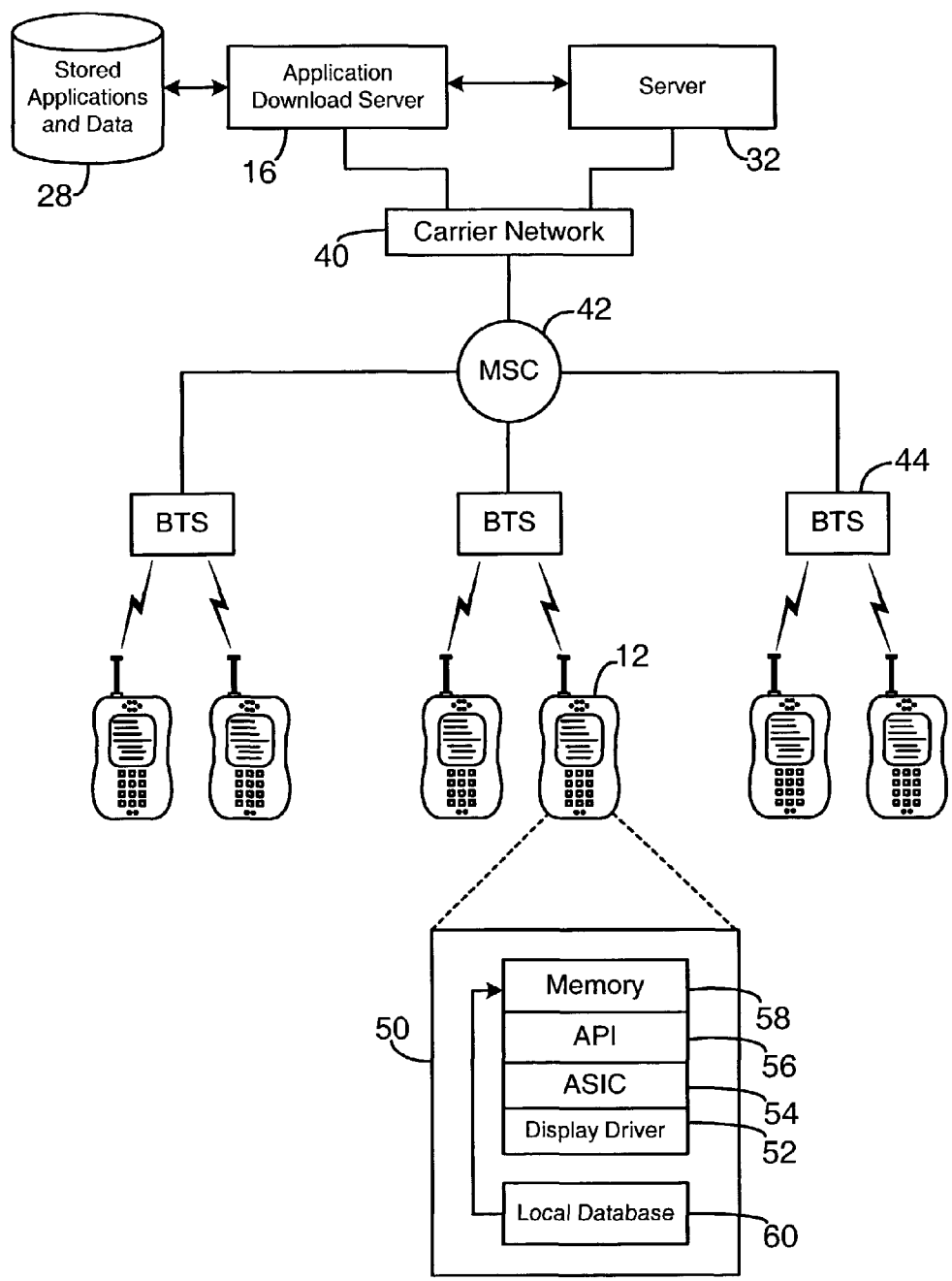
FIG. 2 is a block diagram of the hardware components of the wireless network providing communication between different wireless devices, an application download server, and a database in an exemplary embodiment of the present invention.

FIG. 2 is a block diagram of the hardware components of the wireless network providing communication between different wireless devices, an application download server, and a database in an exemplary embodiment of the present invention. The wireless network 14 is merely exemplary and can include any system whereby remote modules, such as wireless devices 12,18,20,22, communicate over-the-air between and among each other and/or between and among components of a wireless network 14, including, without limitation, wireless network carriers and/or servers. The application download server ("ADS") 16 and the stored applications database 28 will be present on the cellular data network with any other components that are needed to provide cellular telecommunication services. The server 32 may provide other functions used by one or other components, such as application management functions for the application download server. The server 32 and ADS may use a synchronizer interface tool (not shown) to communicate data between the systems. The server or other components of the system may interface with other systems not shown to transmit or receive data. The synchronizer tool may be used in supporting communication with these other systems as well.

The application download server 16, and/or other servers communicate with a carrier network 40, through a data link, such as the Internet, a secure LAN, WAN, or other network. The carrier network 40 controls messages (generally being data packets) sent to a messaging service controller ("MSC") 42. The carrier network 40 communicates with the MSC 42 by a network, the Internet and/or POTS ("plain ordinary telephone system"). Typically, the network or Internet connection between the carrier network 40 and the MSC 42 transfers data, and the POTS transfers voice information. The MSC 42 is connected to multiple base stations ("BTS") 44. In a similar manner to the carrier network, the MSC 42 is typically connected to the BTS 44 by both the network and/or Internet for data transfer and POTS for voice information. The BTS 44 ultimately broadcasts messages wirelessly to the wireless devices, such as cellular telephone 12, by short messaging service ("SMS"), or other over-the-air methods known in the art.

The wireless device, such as cellular telephone 12, has a computer platform 50 that can receive and execute software applications and display data transmitted from the application download server 16. The computer platform 50 also allows the wireless device to interact with data and applications resident on network servers. The computer platform 50 includes, among other components, a display driver 52 that drives the graphics display 13 and renders images on the graphics display 13 based upon graphics data received at the computer platform 50. The computer platform 50 also includes an application-specific integrated circuit ("ASIC") 54, or other processor, microprocessor, logic circuit, or other data processing device. The ASIC 52 is installed at the time of manufacture of the wireless device and is not normally upgradeable. The ASIC 52 or other processor executes the application programming interface ("API") layer 56 that interfaces with any resident programs in the memory 58 of the wireless device. The memory can be comprised of read-only or random-access memory (RAM and ROM), EPROM, EEPROM, flash cards, or any memory common to computer platforms. The computer platform 50 also includes a local database 60 that can hold the software applications not actively used in memory 58, such as the software applications downloaded from the application download server 16. The local database 60 is typically comprised of one or more flash memory cells, but can be any secondary or tertiary storage device as known in the art, such as magnetic media, EPROM, EEPROM, optical media, tape, or soft or hard disk.

The wireless device, such as cellular telephone 12, can access and download many types of applications, such as games and stock monitors, or simply data such as news and sports-related data. The downloaded data can be immediately displayed on the display or stored in the local database 60 when not in use. The software applications can be treated as a regular software application resident on the wireless device 12,18,20,22, and the user of the wireless device can selectively upload stored resident applications from the local database 60 to memory 58 for execution on the API 56. The end-user of the wireless device 12,18,20,22 can also selectively delete a software application from the local database 60.

Figure 3:
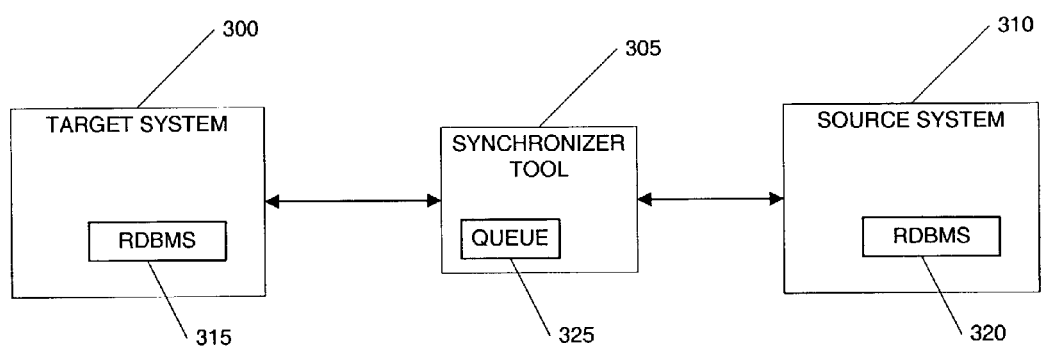
FIG. 3 is a block diagram detecting the architecture of the synchronizer tool interface in an exemplary embodiment of the present invention.

FIG. 3 is a block diagram depicting the architecture of a synchronizer tool interface in an exemplary embodiment of the present invention. In one embodiment, the synchronizer tool 305 enables tables in one RDBMS system to be synchronized with a destination system via a standard XML interface. It will be recognized by those skilled in the art that the XML language is an implementation choice and other languages may be used. Furthermore, it will also be recognized that the synchronizer tool may be used to synchronize or communicate other information, not just information from RDBMS tables, between computer systems or subsystems. In addition, the connections between the interface and the target and source systems may be by any communication media available, such as wireless, including RF, satellite and infrared communication, and wire-based communication methods. In one embodiment, the communications medium is IP based.

Data received from the RDBMS 320 in the source system 310 is stored in the queue 325 of the synchronizer tool 305. This data is translated into a common file format such as XML. By having a storage mechanism, such as a queue, the synchronizer tool can maintain the data for the RDBMS 315 even if the source system 310 is off line. The synchronizer tool 305 may also be implemented to provide an acknowledgement to the source system 310 when the data sent to the target system 315 is replicated in the RDBMS 315 (the target system may provide an acknowledgement to the synchronizer tool 305 indicating this replication has occurred, acknowledge the receipt of the data, or acknowledge other processing was performed).

The source system 310 is connected to the synchronizer tool 305. This connection may be by any communication mechanism, including wireless and/or wire-based connection (or combination thereof). The synchronizer tool 305 may be local to the source system 310 or it may be remote to it. The source system transfers information to the synchronizer via this connection. This information may be data for replication to a remote database, or may be any type of information destined for another system, such as a message request, data request or other data transfer. In one embodiment, the source system 310 sends this information to the synchronizer tool 305 using an XML format.

The target system receives the information from the synchronizer tool 305 and may respond with an acknowledgement to the synchronizer tool 305. Alternatively, the synchronizer tool may interact directly with a subsystem in the target system 300 (such as a RDBMS 315) to perform a task such as data replication.

Note the definition of a target system 300 and source system 310 is somewhat arbitrary. In one instance a system may be the source system sending data to a target system while in another instance the same system is acting as the target system receiving data from another system.

Figure 4:
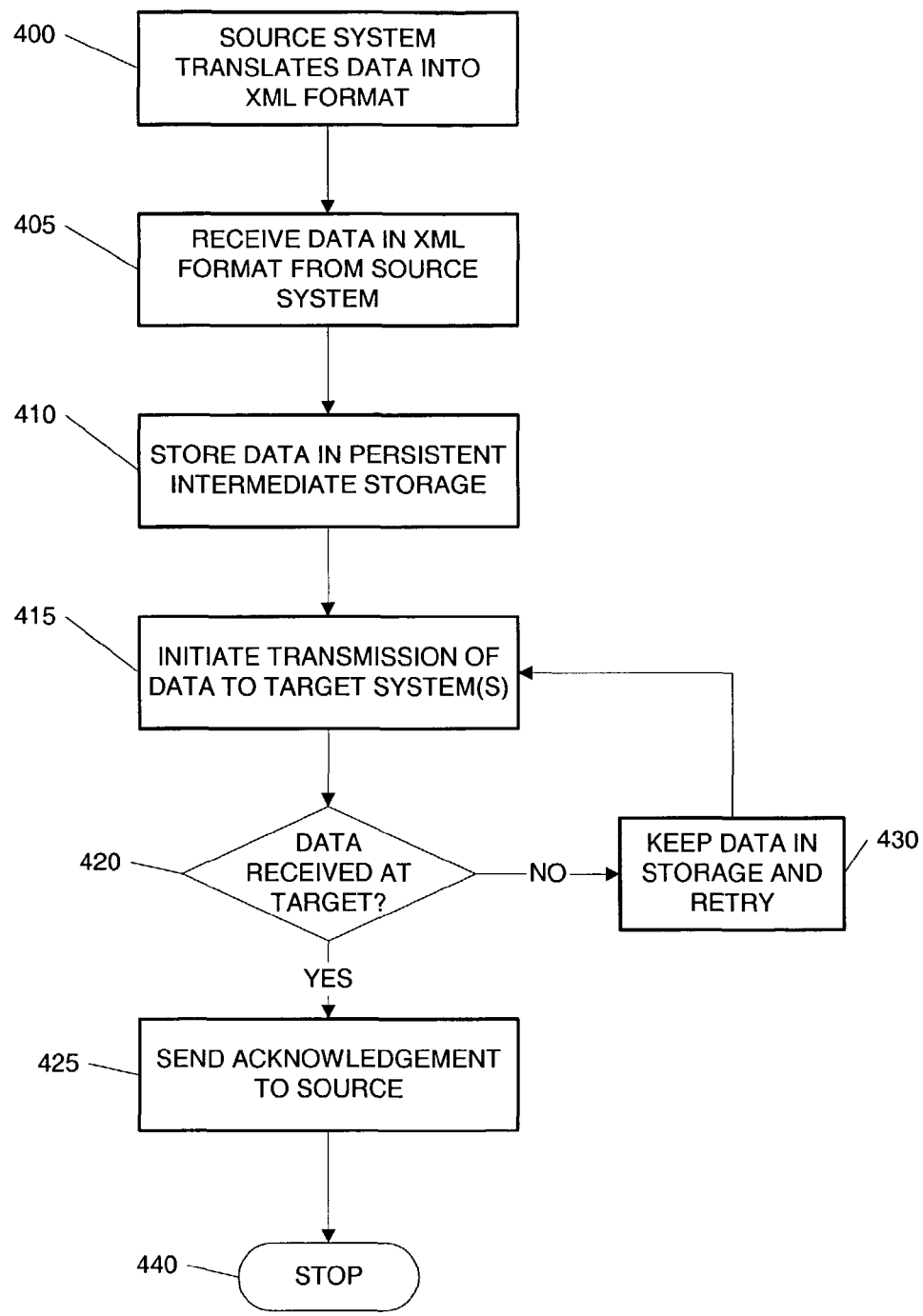
FIG. 4 is a flowchart depicting the process of the synchronizer tool interface in an exemplary embodiment of the present invention.

FIG. 4 is a flowchart depicting the process of the synchronizer tool interface in an exemplary embodiment of the present invention. The method begins by having the source system translate data into a XML format (Step 400) or some other common format. This data may be in the form of scalar data for the target system, a request for information from the target system or other information to be transferred for processing by the target system. Next the data is transmitted to and received by the synchronizer tool (Step 405).

The data is stored in a persistent intermediate storage (Step 405), such as a queue within a synchronizer tool. This allows some independence between the source and target systems. The source system may make the request, have it stored in the queue and can go offline while the request gets transmitted to and/or processed by the target system. In addition, the synchronizer tool may send an acknowledgement to the source system that it received the data.

The data in XML format is then transmitted from the synchronizer tool to the target system (Step 415). Note that the "data" can be any piece of information desired to be sent to the target system. It may be data used for replication into an RDBMS of the target system. Alternatively, it may be any type of command or information sent to the target system for possible processing by the target system. In addition, there may be multiple target systems receiving this data. The synchronization tool may queue multiple data transmission requests for multiple destinations, including multi-target system destination requests.

The method continues to initiate the translated command on a RDBMS (Step 415). After translating the command into the appropriate language for the RDBMS, it initiates this command by direct access to the target system's RDBMS or by sending the command to a processor, such as one in the target system, for execution.

If the data is received at the target (Step 420), the "Yes" branch is followed and an acknowledgement is sent to the source system (Step 425). The source system formats this acknowledgement into a format readable by the source system, such as in XML. If the source system is not online, the acknowledgement may be queued and further attempts may be made to the source system to inform it that the data was transmitted to the target system. The synchronizer tool may determine if the data was received by receiving an acknowledgement from the target system.

If data is received at the target as determined in Step 420, such as may occur when the target system or RDBMS is offline, then the "No" branch is followed and the data remains in the queue and will retry (Step 430) to initiate a transmission of the data to the target system as described in Step 415. There are many queuing algorithms and time parameters possible to determine when to initiate another transmission to the target system. The preferred algorithm and time is based on the processing capacity, efficiency, available resources (such as available queuing memory) as well as other implementation factors of the systems involved.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but one embodiment of the present invention may be implemented as a combination of hardware and software or in hardware alone. The invention may be implemented with both object-oriented and non-object-oriented programming systems. Additionally, although aspects of the present invention are described as being stored in memory, those skilled in the art will appreciate that these aspects can also be stored on other types of computer-readable media, such as secondary storage devices, like hard disks, floppy disks, or CD-ROM; a carrier wave from the Internet or other propagation medium; or other forms of RAM or ROM.

In addition, it should be noted that various changes and modifications could be made herein without departing from the scope of the invention as defined by the appended claims and their equivalents. Furthermore, although elements of the invention may be described or claimed in the singular, the plural is contemplated unless limitation to the singular is explicitly stated.

What is claimed is:

1. A method of synchronizing information, comprising:
receiving the information from a source system in a common format;
storing the information;
initiating a transmission of the information in the common format to a target system while retaining the information;
receiving a target system acknowledgement indicating the target system received the information; and
sending an acknowledgement to the source system upon receiving the target system acknowledgement,
wherein the information comprises a command directed toward the target system, and
further wherein the target system sending the target system acknowledgement indicates the command was processed.

2. The method of claim 1, wherein the common format comprises an Extensible Markup Language (XML) format.

3. The method of claim 1, wherein the target system comprises a database and the information comprises data for replication in the database.

4. The method of claim 1, further comprising, responsive to receiving an indication that the transmission of information to the target system was unsuccessful, reinitiating the transmission of the information to the target system.

5. The method of claim 1, further comprising:
wherein receiving further comprises receiving the information from multiple source systems associated with multiple target systems; and
wherein initiating further comprises initiating the transmission of the information from the multiple source systems to the associated multiple target systems.

6. The method of claim 1, further comprising:
receiving a source system acknowledgement indicating the acknowledgement was received; and
removing the stored information based on the source system acknowledgement.

7. The method of claim 1, wherein receiving the information further comprises receiving the information after translation by the source system from an initial format readable by the source system.

8. The method of claim 1, further comprising translating the information from the common format to a final format readable by the target system.

9. The method of claim 1, further comprising removing the information after receiving the target system acknowledgement.

10. The method of claim 1, further comprising directly interacting with a subsystem of the target system to replicate the information in the target system.

11. The method of claim 10, wherein the interacting comprises initiating the command by direct access to the subsystem of the target system.

12. The method of claim 11, wherein the subsystem of the target system comprises a database, and wherein the interacting further comprises data replication in the database in correspondence with the information received from the source system.

13. The method of claim 10, wherein the interacting comprises sending the command to a processor of the target system for execution.

14. The method of claim 13, wherein the subsystem of the target system comprises a database, and wherein the interacting further comprises data replication in the database in correspondence with the information received from the source system.

15. The method of claim 1, wherein the source system and the target system correspond to different relational database management systems (RDBMSs).

16. The method of claim 1, further comprising:
formatting the target system acknowledgement into a format readable by the source system,
wherein the sending the acknowledgment to the source system comprises sending the formatted target system acknowledgment.

17. The method of claim 16, wherein the format readable by the source system comprises an Extensible Markup Language (XML) format.

18. A synchronization interface, comprising:
a connection to a source system and a target system;
a storage to store information from the source system;
a processor configured to receive the information from the source system in a common format, to store the information in the storage, to initiate a transmission of the information in the common format to the target system, to receive a target system acknowledgement from the target system, and to send an acknowledgement to the source system in response to receiving the target system acknowledgement,
wherein the information comprises a command directed toward the target system, and
further wherein the target system sending the target system acknowledgement indicates the command was processed.

19. The synchronization interface from claim 18, wherein the processor is further configured to reinitiate the transmission of data to the target system responsive to an indication that the transmission of the information to the target system was unsuccessful.

20. The synchronization interface of claim 18, wherein the processor is further configured to receive the information from multiple source systems associated with multiple target systems, and to initiate the transmission of the information from the multiple source systems to the associated multiple target systems.

21. The synchronization interface of claim 18, wherein the processor is further configured to receive a source system acknowledgement indicating the acknowledgement was received, and to remove the information from the storage.

22. The synchronization interface of claim 18, wherein the information received from the source system in the common format comprises information translated by the source system from an initial format readable by the source system.

23. The synchronization interface of claim 18, wherein the processor is further configured to translate the information received from the source system from the common format to a final format readable by the target system.

24. The synchronization interface of claim 18, wherein the processor is further configured to maintain the information received from the source system in the storage independent of the connection with the source system, and wherein the processor is further configured to remove the information received from the source system from the storage after receiving the target system acknowledgement.

25. The synchronization interface of claim 18, wherein the processor is further configured to directly interact with a subsystem of the target system to replicate the information in the target system.

26. The synchronization interface of claim 25, wherein the processor is further configured to initiate the command by direct access to the subsystem of the target system.

27. The synchronization interface of claim 26, wherein the subsystem of the target system comprises a database, and wherein the processor is further configured to replicate data in the database in correspondence with the information received from the source system.

28. The synchronization interface of claim 25, wherein the information received from the source system comprises the command directed toward the target system, wherein the target system acknowledgement indicates the command was processed, and wherein the processor is further configured to send the command to the processor of the target system for execution.

29. The synchronization interface of claim 25, wherein the processor is further configured to send the command to a processor of the target system for execution.

30. A system for synchronizing information, comprising:
means for receiving information from a source system in a common format;
means for storing the information;

means for initiating a transmission of the information in the common format to a target system while retaining the information;

means for receiving a target system acknowledgement indicating the target system received the information; and means for sending an acknowledgement to the source system upon receiving the target system acknowledgement, wherein the information comprises a command directed toward the target system, and further wherein the target system sending the target system acknowledgement indicates the command was processed.

31. A non-transitory computer-readable medium configured to synchronize information, comprising:

computer-executable instructions, comprising:

at least one instruction for causing a computer to receive information from a source system in a common format;

at least one instruction for causing the computer to store the information;

at least one instruction for causing the computer to initiate a transmission of the information in the common format to a target system while retaining the information;

at least one instruction for causing the computer to receive a target system acknowledgement indicating the target system received the information; and at least one instruction for causing the computer to send an acknowledgement to the source system upon receiving the target system acknowledgement, wherein the information comprises a command directed toward the target system, and wherein the target system sending the target system acknowledgement indicates the command was processed.

32. A method of synchronizing information, comprising:

receiving information, in a common format compatible with both a source system and a target system, from the source system for delivery to the target system, wherein the source system and the target system correspond to different relational database management systems (RDBMSs);

transmitting the received information to the target system;

receiving a target system acknowledgement indicating the target system received the information; and sending an acknowledgement to the source system that indicates the target system received the information.

33. The method of claim 32, wherein the RDBMS of the source and target systems include one or more of (i) different database languages, or (ii) different table formats.

34. The method of claim 33, wherein the different table formats of the source and target systems include different field structures and/or record structures.

35. The method of claim 32, wherein the common format compatible with both the source system and the target system corresponds to Extensible Markup Language (XML).

36. The method of claim 32, wherein the target system sending the target system acknowledgement indicates the information was processed.

37. A synchronizer tool, comprising:

means for receiving information, in a common format compatible with both a source system and a target system, from the source system for delivery to the target system, wherein the source system and the target system correspond to different relational database management systems (RDBMSs);

means for transmitting the received information to the target system;

means for receiving a target system acknowledgement indicating the target system received the information; and means for sending an acknowledgement to the source system that indicates the target system received the information.

38. A synchronizer tool, comprising:

a processor coupled to an interface that is configured to:

receive information, in a common format compatible with both a source system and a target system, from the source system for delivery to the target system, wherein the source system and the target system correspond to different relational database management systems (RDBMSs);

transmit the received information to the target system;

receive a target system acknowledgement indicating the target system received the information; and send an acknowledgement to the source system that indicates the target system received the information.

39. A non-transitory computer-readable medium configured to synchronize information, comprising:

at least one instruction for causing a computer to receive information, in a common format compatible with both a source system and a target system, from the source system for delivery to the target system, wherein the source system and the target system correspond to different relational database management systems (RDBMSs);

at least one instruction for causing the computer to transmit the received information to the target system;

at least one instruction for causing the computer to receive a target system acknowledgement indicating the target system received the information; and at least one instruction for causing the computer to send an acknowledgement to the source system that indicates the target system received the information.

* * * * *